(12) United States Patent
Gillett

(10) Patent No.: US 10,860,038 B2
(45) Date of Patent: Dec. 8, 2020

(54) SYSTEM AND METHOD FOR AUTOMATIC ROTORCRAFT TAIL STRIKE PROTECTION

(71) Applicant: Textron Innovations Inc., Providence, RI (US)

(72) Inventor: Luke Dafydd Gillett, Grapevine, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 229 days.

(21) Appl. No.: 15/905,349

(22) Filed: Feb. 26, 2018

(65) Prior Publication Data

US 2019/0265729 A1 Aug. 29, 2019

(51) Int. Cl.
| | | |
|---|---|---|
| G05D 1/08 | (2006.01) | |
| B64D 45/04 | (2006.01) | |
| B64C 27/04 | (2006.01) | |
| B64C 27/58 | (2006.01) | |
| B64C 27/00 | (2006.01) | |
| B64C 13/50 | (2006.01) | |

(52) U.S. Cl.
CPC ......... *G05D 1/0808* (2013.01); *B64C 13/503* (2013.01); *B64C 27/006* (2013.01); *B64C 27/04* (2013.01); *B64C 27/58* (2013.01); *B64D 45/04* (2013.01)

(58) Field of Classification Search
CPC .. G05D 1/0808; B64C 13/503; B64C 27/006; B64C 27/58; B64C 27/04; B64D 45/04
USPC ............................................................ 701/4
See application file for complete search history.

(56) References Cited

U.S. PATENT DOCUMENTS

| | | | |
|---|---|---|---|
| 5,188,511 A | 2/1993 | Ebert | |
| 5,901,927 A | 5/1999 | Ho | |
| 2014/0363288 A1* | 12/2014 | Schaeffer | B64C 27/57 416/1 |
| 2016/0122000 A1* | 5/2016 | Mahmulyin | G05D 1/0066 244/230 |
| 2016/0288922 A1* | 10/2016 | He | B64D 45/08 |
| 2017/0168507 A1* | 6/2017 | Paduano | G05D 1/042 |
| 2017/0242444 A1* | 8/2017 | Eggold | G05D 1/0676 |
| 2020/0148393 A1* | 5/2020 | Chavez | G07C 5/0808 |

FOREIGN PATENT DOCUMENTS

| | | |
|---|---|---|
| RU | 2364548 C2 * | 8/2009 |
| WO | 2016053408 A1 | 4/2016 |

* cited by examiner

*Primary Examiner* — Bao Long T Nguyen
*Assistant Examiner* — Jean W Charleston
(74) *Attorney, Agent, or Firm* — Slater Matsil, LLP

(57) ABSTRACT

An embodiment rotorcraft includes a main rotor, one or more flight controls connected to the main rotor and operational to control flight characteristics of the main rotor by pitching a nose of the rotorcraft upward, and a flight control computer (FCC) operable to determine an attitude command and to generate an adjusted attitude command by adjusting a magnitude of the attitude command according to an above ground level (AGL) altitude of the rotorcraft. The FCC is further operable to control a flight characteristic of the rotorcraft by sending the adjusted attitude command to one or more flight controls.

17 Claims, 6 Drawing Sheets

SYSTEM AND METHOD FOR AUTOMATIC ROTORCRAFT TAIL STRIKE PROTECTION

TECHNICAL FIELD

The present invention relates generally to a system and method for protecting an aircraft against a tail strike, and, in particular embodiments, to a system and method for automatically damping rotorcraft pitching to prevent tail section strikes against a landing surface.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotorcraft includes a main rotor, one or more flight controls connected to the main rotor and operational to control flight characteristics of the main rotor by pitching a nose of the rotorcraft upward, and a flight control computer (FCC) operable to determine an attitude command and to generate an adjusted attitude command by adjusting a magnitude of the attitude command according to an above ground level (AGL) altitude of the rotorcraft. The FCC is further operable to control a flight characteristic of the rotorcraft by sending the adjusted attitude command to one or more flight controls.

An embodiment flight control computer (FCC) includes a processor, and a non-transitory computer-readable storage medium storing a program to be executed by the processor. The program includes instructions for determining an attitude command, determining an above ground level (AGL) altitude, generating, in response to the AGL altitude being below an altitude threshold, an adjusted attitude command by limiting a magnitude of the attitude command, and controlling a flight characteristic of a rotorcraft by sending the adjusted attitude command to one or more flight controls.

An embodiment method includes determining an attitude command by a flight control computer (FCC), determining an above ground level (AGL) altitude, generating, by the FCC and in response to the AGL altitude being below an altitude threshold, an adjusted attitude command by limiting a magnitude of the attitude command, and controlling, by the FCC, a flight characteristic of a rotorcraft by sending the adjusted attitude command to one or more flight controls.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
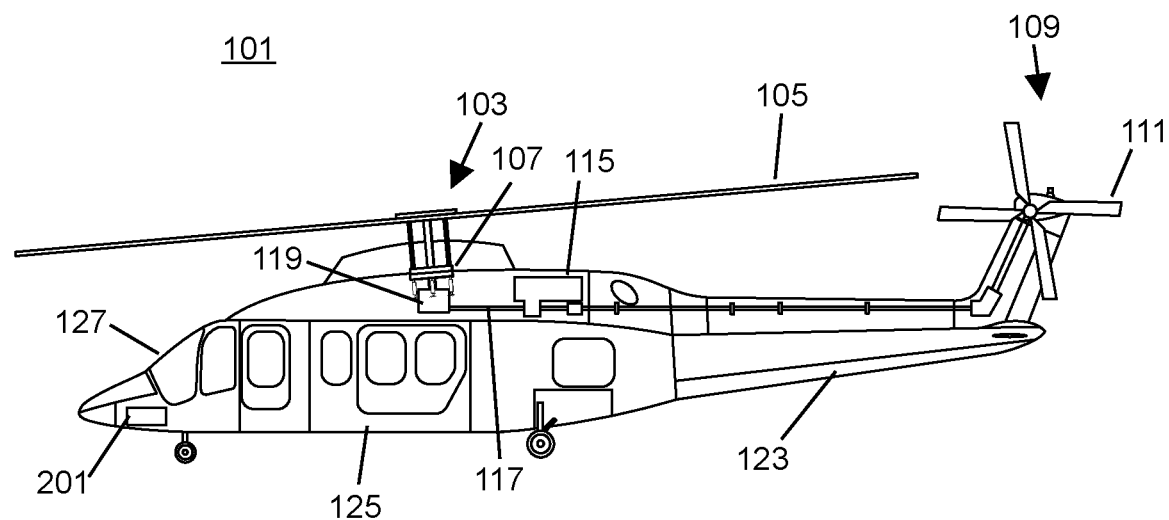
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain features, the rotorcraft 101 may have a variety of implementation-specific configurations. For instance, in some embodiments, cockpit 127 is configured to accommodate a pilot or a pilot and co-pilot. It is also contemplated, however, that rotorcraft 101 may be operated remotely, in which case, cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case, cockpit 127 could be eliminated entirely in order to save space and cost.

Figure 2:
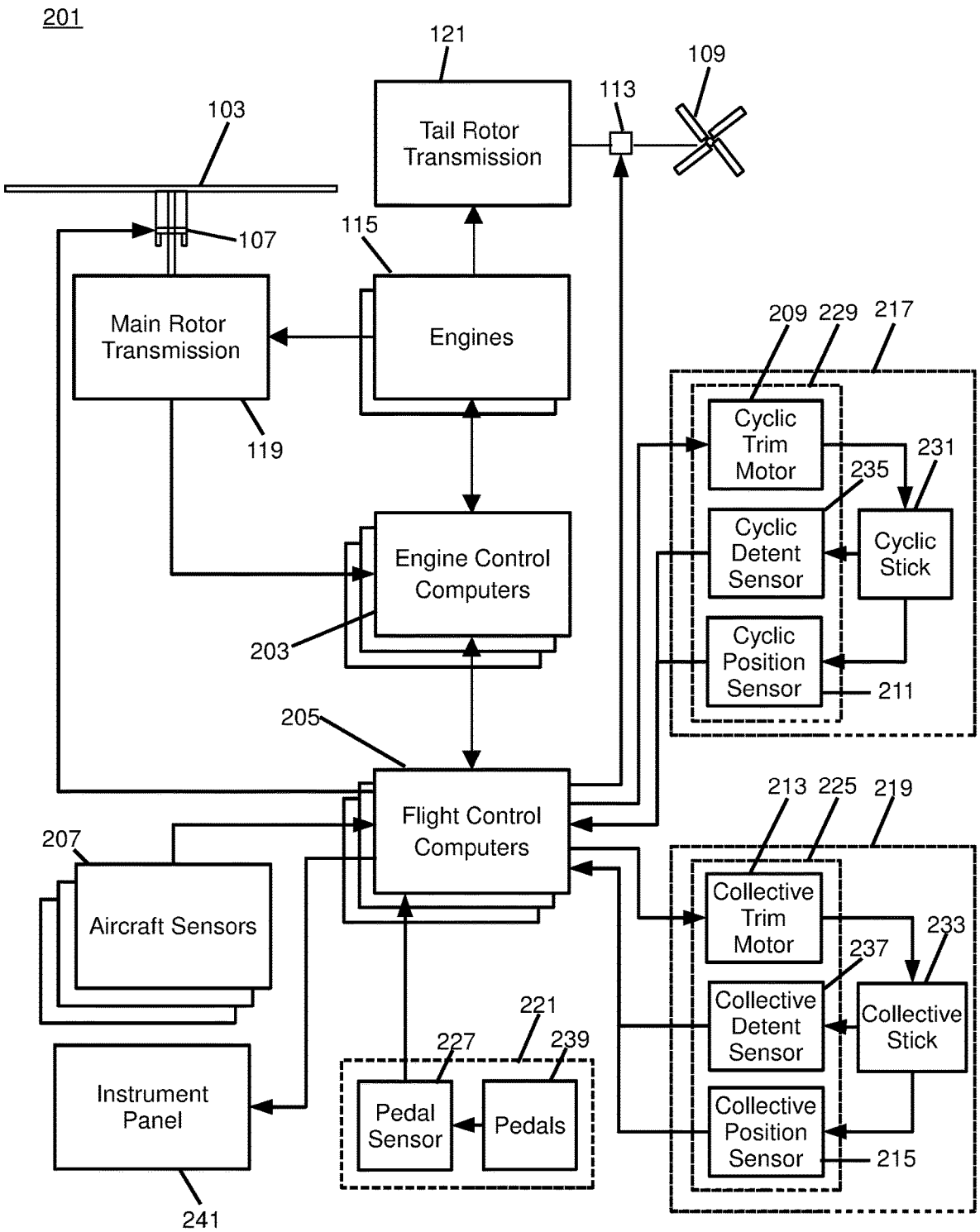
FIG. 2 illustrates a fly-by-wire flight control system for a rotorcraft according to some embodiments.

FIG. 2 is a block diagram of a fly-by-wire flight control system 201 for the rotorcraft 101, according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic trim motors 209 and collective trim motors 213 may drive the cyclic stick 231 and collective stick 233, respectively, to suggested positions. The cyclic trim motors 209 and collective trim motors 213 may drive the cyclic stick 231 and collective stick 233, respectively, to suggested positions, but this movement capability may also be used to provide tactile cueing to a pilot. The cyclic trim motors 209 and collective trim motors 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the cyclic trim motors 209 and collective trim motors 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
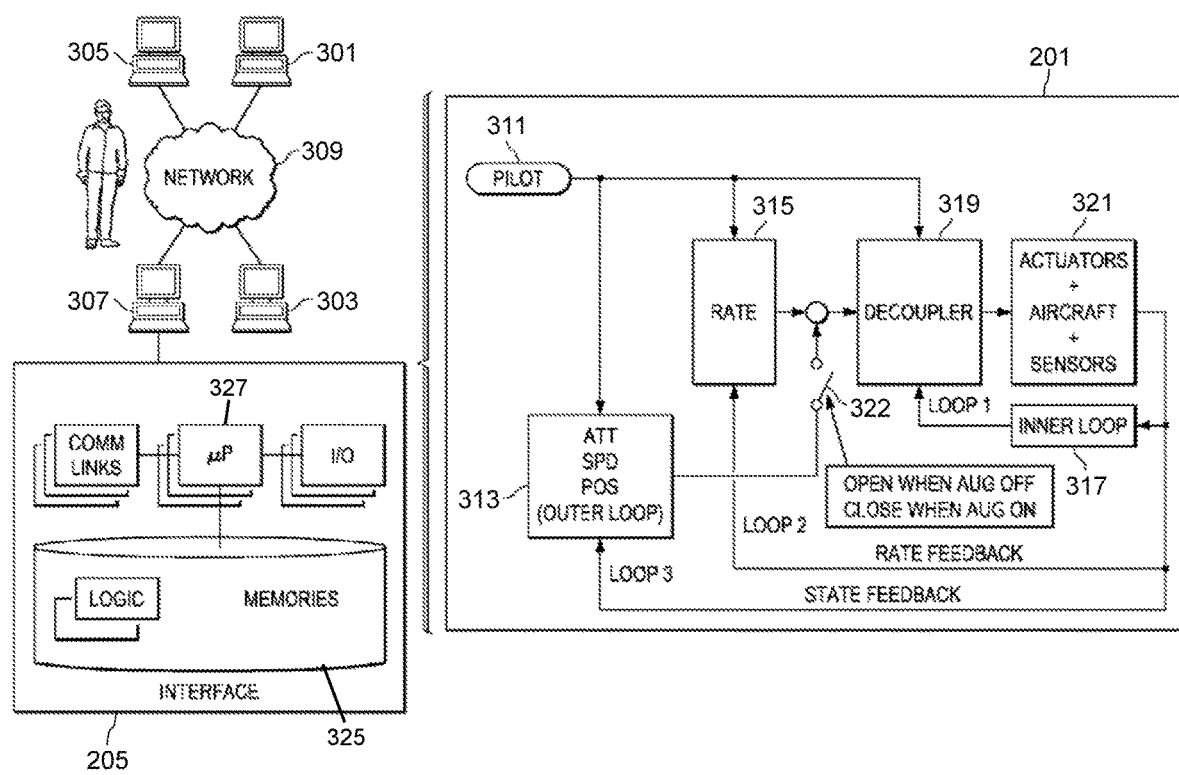
FIG. 3 representatively illustrates a three-loop flight control system according to some embodiments.

FIG. 3 is a block diagram of the flight control system 201, according to some embodiments. Some operational aspects of the flight control system 201 are shown in a highly schematic fashion. In particular, the flight control system 201 is schematically shown as being implemented as a series of inter-related feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. However, all, some, or none of the components (301, 303, 305, 307) of flight control system 201 could be located external or remote from the rotorcraft 101 and communicate to on-board devices through a network connection 309.

The flight control system 201 has a pilot input 311, an outer loop 313, a middle loop 315, an inner loop 317, a decoupler 319, and aircraft equipment 321 (corresponding, e.g., to flight control devices such as swashplate 107, tail rotor transmission 121, etc.; to actuators (not shown) driving the flight control devices; to sensors such as aircraft sensors 207, cyclic position sensors 211, collective position sensors 215, cyclic detent sensors 235, collective detent sensors 237, etc.; and the like).

In the example shown, a three-loop design separates the inner stabilization and rate feedback loops from outer guidance and tracking loops. The control law structure primarily assigns the overall stabilization task and related tasks of reducing pilot workload to inner loop 317. Next, the middle loop 315 (sometimes called the rate loop) provides rate augmentation. Outer loop 313 focuses on guidance and tracking tasks. Since inner loop 317 and middle loop 315 provide most of the stabilization, less control effort is required at the outer loop level. As representatively illustrated, a switch 323 may be provided to turn outer loop flight augmentation on and off, the tasks of outer loop 313 are not necessary for flight stabilization.

In some embodiments, the inner loop 317 and middle loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. According to some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The flight control system 201 may be realized as programming executed by the FCCs 205. The programming includes instructions implementing aspects of the flight control system 201. The FCCs 205 may include memories 325, such as non-transitory computer readable storage mediums, that store the programming. One or more processors 327 are connected to the memories 325, and are operable to execute the programming.

In some embodiments, the FCCs 205 monitor an altitude and pitch commands from automated systems to determine whether the pitch commands are great enough to exceed a threshold and may cause the rotorcraft to strike the tail section during a landing sequence. The CCs may moderate or dampen the pitch commands from an automated system to keep the tail section angled to avoid the tail striking landing surface as the rotorcraft lands.

Figure 4A:
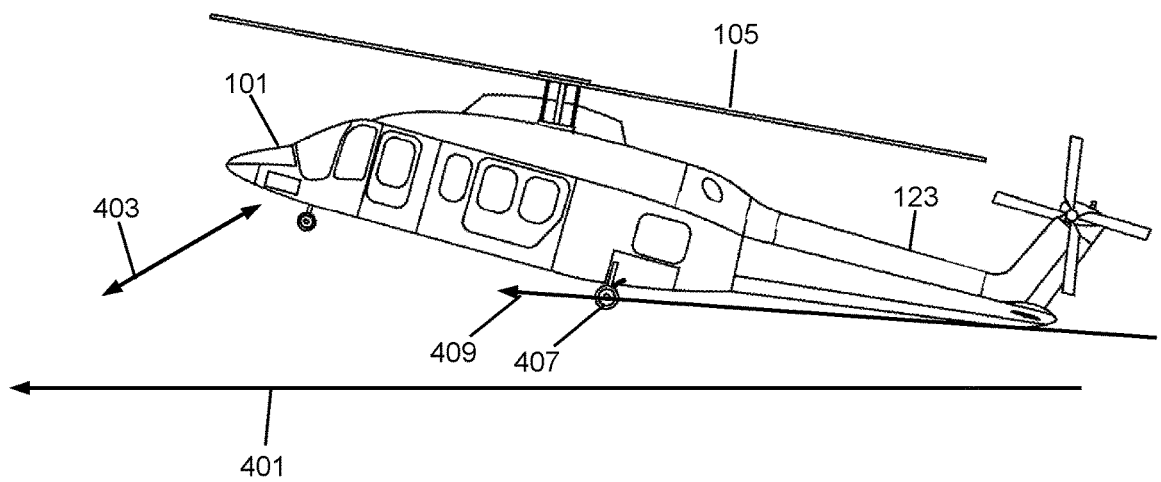
FIGS. 4A and 4B illustrate a rotorcraft at different pitch attitudes according some embodiments.
Figure 4B:
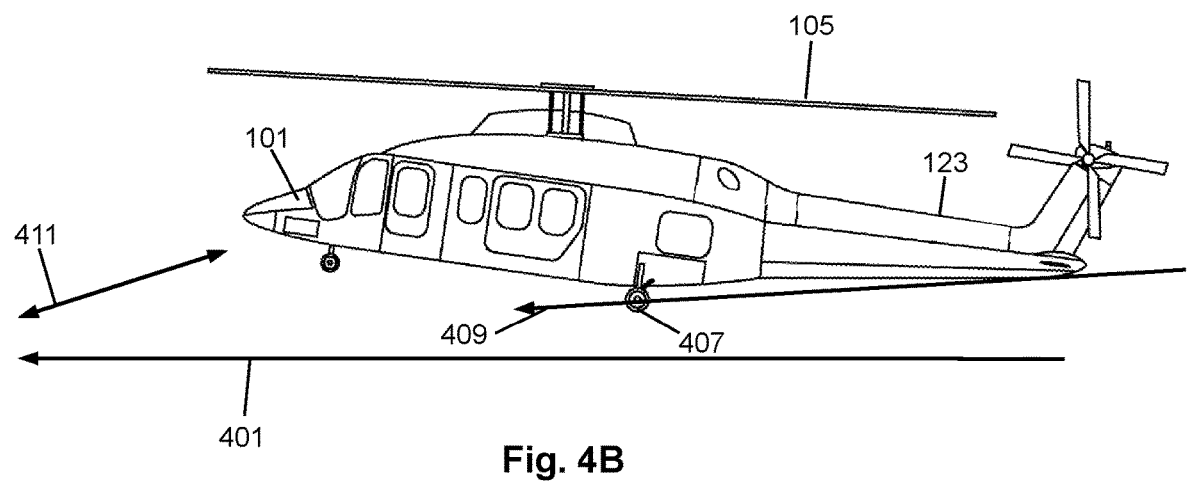

FIGS. 4A and 4B illustrate a rotorcraft 101 at different pitch attitudes according some embodiments. FIG. 4A illustrates a rotorcraft with a negative tail section pitch according to some embodiments. In some embodiments, when a rotorcraft 101 has a downward flight path 403, an automated system or pilot may send commands to a main rotor 105 to pitch the rotorcraft nose upwards to reduce the rotorcraft's 101 forward speed. Pitching the nose of the rotorcraft 101 upwards angles the plane of the main rotor blade 105 backwards so that the thrust provided by the main rotor 105 is upwards and backwards. The backward or rearward component of the main rotor thrust counteracts the rotorcraft's forward speed. However, in some situations, a rotorcraft's forward speed may be large enough that an upward pitch sufficient to counteract the forward speed may lower the tail section 123 of the rotorcraft 101 to a degree that the tail section 123 may strike a landing surface 401 when landing then rotorcraft 101. This nose upwards may, in some cases, be automatically performed by an automated flight process, for example, in by a speed or hover hold process and response to a gust of wind. The automated process may detect movement of the rotorcraft 101 and may pitch the nose upwards in order to move the rotorcraft 101 backwards to hold a position or move the rotorcraft backwards. Pitching the nose up while close to the ground may result in the tail section 123 striking the landing surface 401, even when not landing.

A rotorcraft may have landing gear 407 such as wheels, landing skids or the like. A tail section strike plane 409 may be a plane that extends through the landing gear 407 to a lowest rearmost portion of the rotorcraft tail section 123. The tail section strike plane 409 may represent a plane or region in which the tail section 123 may strike a landing surface 401 when the rotorcraft 101 lands. The tail section strike plane may be a plane that apses through the landing gear to account, for example, for compression of a shock absorbing landing gear, or the like. In some embodiments, when the tail section strike plane 409 has a negative slope, the tail section strike plane 409 may indicate that a portion the tail section 123 is lower than the landing gear 407. In some landing situations, a rotorcraft 101 may have a forward speed during landing that causes an automated system to pitch the rotorcraft 101 nose up to reduce the forward speed of the rotorcraft 101. The nose up pitch imparted by the automated system may cause the tail section strike plane 409 to have a negative slope, with the lowermost surface of the tail section 123 below the landing gear 407. In some embodiments, the FCCs may monitor the altitude of the rotorcraft 101, and may dampen the pitch up command created by the automated process when the rotorcraft 101 is below a predetermined threshold to reduce the amount of pitch that the automated system imparts to the rotorcraft. For example, during execution of an automated process such as a position hold, automated hover process, automated landing sequence, or the like, the FCCs may detect a pitch command from the automated process that exceeds a pitch threshold, and may modify or adjust the pitch command to reduce the absolute pitch of the rotorcraft 101 to avoid the tail section 123 striking the landing surface 401.

FIG. 4B illustrates a rotorcraft with a positive tail section pitch according to some embodiments. In some landing situations, the rotorcraft 101 may be pitched so that the tail section strike plane 409 has a positive slope, where the lowermost or lower rearmost portion of the tail section 123 is above the landing gear 407. In this landing situation, the pitch of the rotorcraft 101 may be commanded by an automated process, however, the FCCs may determine that the pitch is below a pitch threshold, and permit the pitch of the rotorcraft 101 to be implemented by the automated process commands without adjustment. The positive slope of the tail section strike plane 409 results in the landing gear 407 touching the landing surface 401 before the tail section 123.

Figure 5:
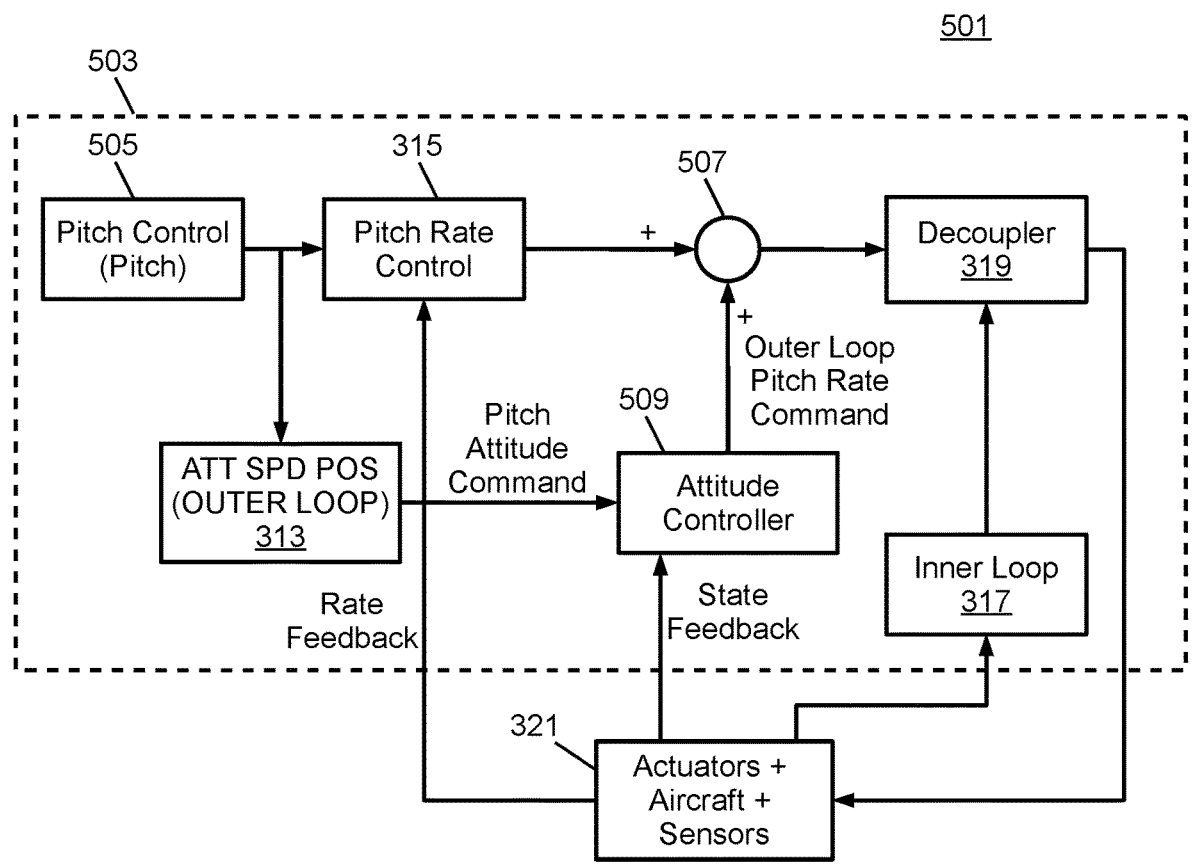
FIG. 5 illustrates a block diagram of a further embodiment flight control system.

FIG. 5 illustrates a flight control system 501 according to some embodiments. A pilot control 505 is a control such as a cyclic controller or stick of the rotorcraft, and may generate pilot control commands such as, for example, pitch commands generated by pilot movement of the pilot control 505. In some embodiments, the pilot control 505 interfaces with a flight controller 503 such as an FCC or the like. In various embodiments, flight controller 503 is implemented using a flight computer, or other processing hardware. Flight controller 503 also interfaces with, and controls, aircraft equipment 321 representing various actuators, sensors, and the physical controls of the rotorcraft. In various embodiments, flight controller 503 controls aircraft equipment 321 using three logical loops, including the inner loop, a rate feedback loop and a state feedback loop. The inner loop stabilizes the dynamics of the rotorcraft, the rate loop controls the angular rates of the rotor craft, and the outer loop provides control signals to the inner loop and/or rate loops to effect a desired attitude, speed and position of the rotorcraft. In some embodiments, the outer loop supports and provides flight augmentation or auto-pilot functionality and may be manually or automatically disabled based on flight and system conditions. The inner loop and rate feedback loops, on the other hand, remain operational to provide stability to the rotorcraft.

For purposes of illustration, flight controller 503 is illustrated with respect to the general control blocks that affect the rotational rate of an embodiment rotorcraft, namely the control blocks affecting the pitch rate of the rotorcraft. It should be understood that flight controller 503 may also include other controllers and control paths that affect the yaw, roll, and other states of the rotorcraft in addition to the pitch rate. As shown, the inner stabilization loop is controlled by inner loop controller 317, the middle loop or rate loop is controlled by pitch rate controller 315, and the outer loop is controlled by outer loop controller 313 in conjunction with an attitude controller 509 that provides pitch and roll control.

Each of inner loop controller 317, decoupler 319 and rate controller 315 may be implemented using flight control algorithms known in the art. Inner loop controller 317 receives sensor feedback from sensors such as gyroscopes and accelerometers within the rotorcraft and provides control signals to various actuators, such as the swashplate actuators to stabilize the rotorcraft. Rate controller 315 receives rate feedback from rate gyroscopes on all axes and provides a rate command signal to inner loop controller 317 based on the rate feedback and the position of pilot stick pitch block 401*a* and pilot stick roll block 401*b* in some modes of operation. Decoupler 319 receives the various rate commands and approximately decouples all 4-axes (pitch, roll, yaw, and vertical) such that, for example, a forward longitudinal stick input does not require the pilot to push the stick diagonally.

Outer loop controller 313 receives state feedback from the sensors of aircraft equipment 321. This state feedback may include, for example, speed, position and attitude. During an automated flight control process, such as a speed hold process, a position hold process, a hover hold process, an automated approach to hover, an automated approach to landing, or the like, the outer loop controller 313 may provide navigation or movement processes that supplement a pilot's command of the rotorcraft. The outer loop controller 313 may provide pitch attitude commands, along with commands on other axes, as part of the automated flight control process. In some embodiments, The outer loop controller 313 may receive a command from the pilot control 505, and may override an automated flight control process, and in other embodiments, the attitude controller 509 may determine whether the pilot has input a command, and cancel or attenuate commands from the outer loop controller 313, or allow the pilot to override attenuation of a pitch attitude command from the outer loop controller 313. Thus, a pilot is able to input manual commands through the pilot control 505 that may cause the rotorcraft to pitch past the pitch threshold.

The pitch attitude commands may be determined using a speed control loop, an attitude control loop, or the like. Attitude controller 509 calculates pitch attitude errors by subtracting the pitch attitude feedback from the pitch attitude command. In various embodiments, the pitch feedback is a component of the state feedback. The attitude controller 509 applies a dynamic control algorithm to the pitch attitude error to produce an outer loop pitch rate command. The outer loop pitch rate command is applied to decoupler 319 via summing block 507 by combining the outer loop pitch rate command with pilot pitch commands. Although the embodiment shown illustrates attitude controller 509 providing pitch attitude correction, the attitude controller 509 may be used to provide attitude control for roll or yaw as well.

The outer loop controller 313 may provide an automated flight control process to assist the pilot, or to reduce pilot workload while flying the rotorcraft. For example, a hover hold process may include the outer loop controller 313 maintaining a height and a location automatically without pilot input. The outer loop controller 313 receives attitude, speed, position and altitude data from sensors and the like, and determines whether the rotorcraft is stationary and maintaining the desired altitude or position within an acceptable range. When outside factors, such as wind, cause the rotorcraft to drift or change altitude, the outer loop controller 313 may detect the change in attitude or altitude, and may generate commands, such as a pitch attitude command, co correct for the movement. However, when the rotorcraft is near the ground, or below an altitude threshold, the pitch attitude command may be great enough that the rotorcraft risks striking the tail section on the landing surface. The attitude controller 509 may use state feedback or sensor data from sensors 321 to determine the altitude above ground, and may adjust the pitch attitude command if the rotorcraft altitude falls below the latitude threshold. For example, if the outer loop detects a 3 knot drift forward while in a hover hold process, the outer loop controller 313 may generate a pitch attitude command associated with a 3 knot backward speed. The attitude controller 509 may determine that the pitch attitude required to achieve the desired backward speed is too great based on the rotorcraft's altitude, and may limit the pitch attitude. The limit on the pitch attitude may reduce the desired backward speed, however, the outer loop controller 313 would merely maintain the pitch attitude command for a longer period to regain the desired location. The outer loop detects speed and position movements by determining the actual speed or position of the rotorcraft, and finding the speed or position error with respect to the intended speed or position, and attempts to correct the speed or position error. Limiting the pitch attitude may dampen the outer loop ability to react to speed or position errors or the response time needed to correct the speed or position error, but still permits automatic correction of the speed or position error while preventing tail trike damage to rotorcraft.

Figure 6:
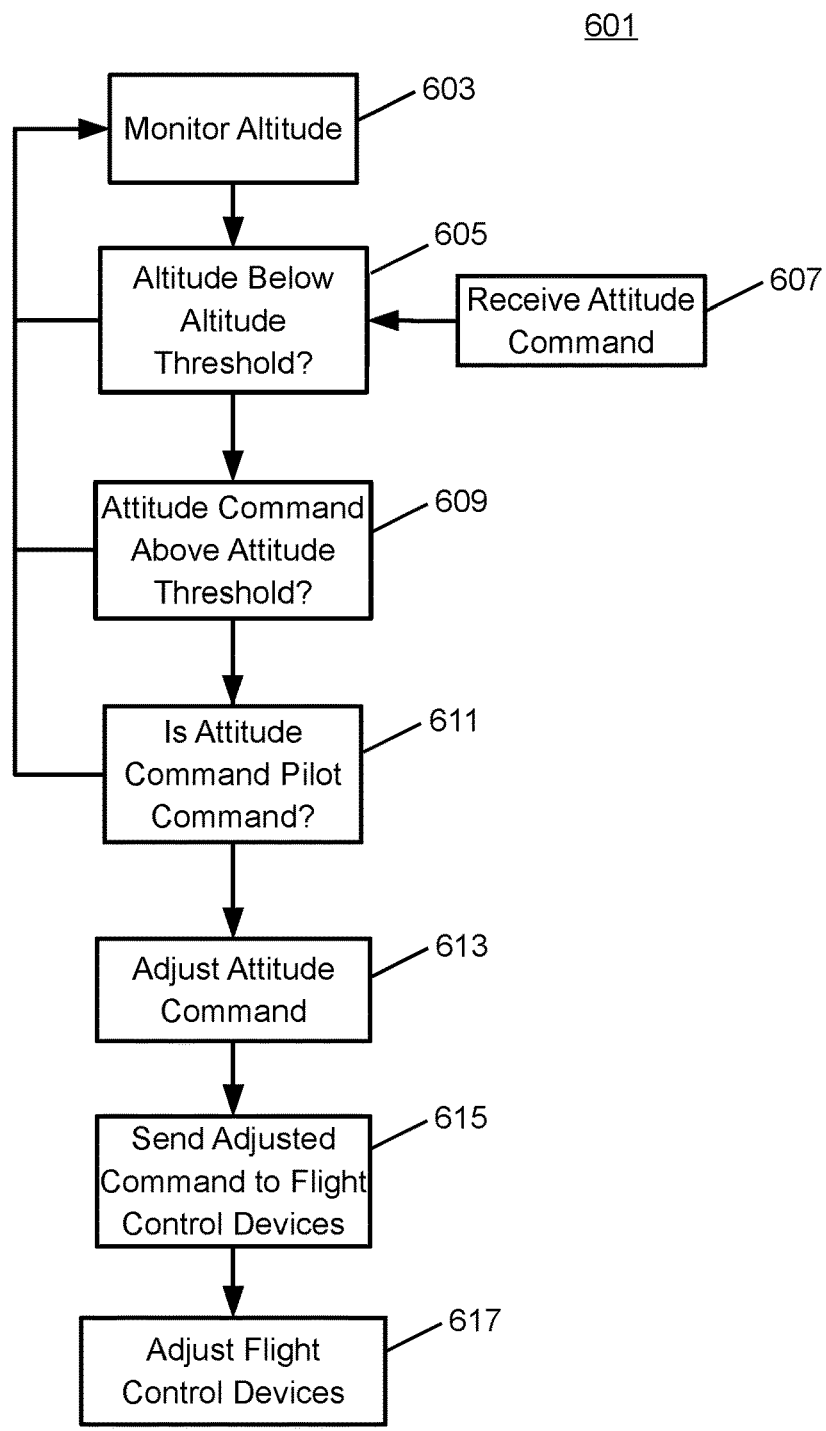
FIG. 6 is a flow diagram illustrating a method for automatic tail strike protection according to some embodiments.

FIG. 6 is a flow diagram illustrating a method 60o for automatic tail strike protection according to some embodiments. In block 603, FCCs monitor altitude of a rotorcraft. In some embodiments, the altitude is determined from altitude data in an altitude data signal received from one or more aircraft sensors. The altitude data may be generated by a radar sensor, and may provide an above ground level (AGL) altitude. In some embodiments, a radar altitude may be more accurate at short distances than an air pressure based altimeter, since the radar altitude data has greater resolution, while an air pressure based altimeter relies on atmospheric pressure, which may vary. In other embodiments, the altitude data may be a combination of radar data and air pressure altimeter data, or may be determined according to the altitude of the rotorcraft, with radar altimeter data used below a predetermined altitude threshold, and air pressure altimeter data used above the altitude threshold.

In block 607, the FCCs receive an attitude command. The attitude command may, in some embodiments, be received from a pilot control such as a cyclic stick, or may be received from an automated flight control program running in, for example, the outer loop. In other embodiments, the attitude command may be received from a flight stabilization process running in an inner loop, a control decoupling process running in a decoupler, or the like. The attitude command may be generated as a result of a movement command or the like. For example, when an automated fight control process such as a position or hover hold process is running, the automated flight control process may determine that a particular movement is needed to correct for wind, drift, a flight condition, a temporary movement of the rotorcraft by the pilot, or the like. In the position or hover hold command, the FCCS may determine that the rotorcraft needs to move in a particular direction at a particular speed, due to a wind gust, change in selected position to be held, as a result of a pilot input, or other automated process, or the like. The FCCs may determine the attitude needed to achieve the movement command.

In block 605, the FCCs determine whether the altitude is below an altitude threshold. In some embodiments, the altitude threshold is a predetermined threshold, for example, 50 feet AGL or 100 feet AGL. In other embodiments, the altitude threshold is determined on-the-fly, or dynamically, and may be determined according to a forward speed, a current attitude such as a current pitch, a vertical speed, or according to a magnitude of an attitude command, or the like. If the FCCs determine that the altitude is above the altitude threshold, the FCCs then return to block 603 and continue monitoring the altitude until a new attitude command is received. The altitude threshold may indicate an altitude at which a tail strike is unlikely to happen.

If the FCCs determine that the altitude is at, or below the altitude threshold, the FCCs then determine, in block 609, if the attitude command is above an attitude threshold. In some embodiments, the attitude threshold is a predetermined threshold, and in other embodiments, the attitude threshold is determined on-the-fly, or dynamically. The attitude threshold may be determined according to a current altitude, a current forward speed, or the like. In some embodiments, the attitude threshold may be similar to a step function, or have different fixed sub-thresholds at different altitudes. For example, the attitude threshold may be a 9 degree nose upward/tail down pitch between 100 feet AGL and 50 feet AGL, and may be a 2 degree nose upward/tail down pitch below 50 feet AGL. In other embodiments, the attitude threshold may be proportional to altitude. For example, the attitude threshold may be a 2 degrees nose upward/tail down pitch below 50 feet AGL, but between 100 feet AGL and 50 feet AGL, may be proportional to the altitude and limited to between 2 degrees and 9 degrees. Thus, at 50 feet AGL, the attitude threshold may be 2 degrees, at 75 feet AGL the attitude threshold may be 5.5 degrees, and may be 9 degrees at 100 feet AGL.

In block 611, the FCCs may determine whether the attitude command is a pilot command. In some embodiments, the pilot commands may be separate from attitude commands that are generated by an automated flight process, with the pilot commands being generated by a pilot control apparatus such as a control stick, and the commands generated by the automated flight process may be generated by an outer loop, an inner loop, or another portion of an FGCC or the rotorcraft. In another embodiment, the FCCs may determine that a stick is in-detent, with the pilot having released manual control of a particular control device, and determine that a command associated with a control that is in-detent is not a pilot generated command. Determining whether an attitude command is a pilot generated command permits the FCCs to avoid adjusting a pilot generated attitude command so that the pilot overrides the automated pitch attitude management or attenuation provided by the FCCs. When the FCCs determine that a particular attitude command is a pilot command, the FCCs then return to block 603 and continue monitoring the altitude and repeating the attitude command monitoring until a new attitude command is received. Thus, the FCCs may continually monitor the altitude, attitude commands, and pilot control of the attitude to quickly implement or terminate automated pitch management based on the detent state of the pilot controls.

In block 613, the FCCs adjust the attitude command. In some embodiments, the attitude command may be limited to an attitude limit value that may be the same as the associated attitude threshold, or to another attitude limit value that is different from the attitude threshold. For example, in embodiments where the FCCs determine the attitude threshold dynamically in block 609, the FCCs may then limit the attitude command to the attitude threshold to take advantage of the threshold already being calculated. In other embodiments, rotorcraft performance may be tuned by calculating the attitude limit separately from the attitude threshold, with the attitude limit being a predetermined limit, or calculated dynamically. Thus, the attitude command may be adjusted by generating an adjusted attitude command that equals the attitude limit.

In other embodiments, the attitude command may be adjusted by attenuating or modifying magnitude of the pitch in the attitude command. The attitude command may be above a particular threshold, and the magnitude of the attitude command may be attenuated by reducing the magnitude of the attitude command by a set amount, a set percentage, or the like. For example, where the magnitude of the attitude command is greater than the attitude threshold, the magnitude of the attitude command may be reduced by half. Thus, attitude commands may be damped when the rotorcraft is at a low AGL altitude to prevent overcontrolling the rotorcraft during landing or hover close to the ground.

In block 615, the adjusted command is sent to flight control devices. In some embodiments, the adjusted attitude command is an outer loop pitch rate command sent to the decoupler, and then on to one or more actuators. In block 617, one or more flight control devices are adjusted according to the adjusted attitude command to control a flight characteristic of the rotorcraft.

An embodiment rotorcraft includes a main rotor, one or more flight controls connected to the main rotor and operational to control flight characteristics of the main rotor by pitching a nose of the rotorcraft upward, and a flight control computer (FCC) operable to determine an attitude command and to generate an adjusted attitude command by adjusting a magnitude of the attitude command according to an above ground level (AGL) altitude of the rotorcraft. The FCC is further operable to control a flight characteristic of the rotorcraft by sending the adjusted attitude command to one or more flight controls.

In some embodiments, the rotorcraft further includes a radar altitude sensor operable to detect the AGL altitude of the rotorcraft during flight. In some embodiments, the attitude command is a pitch command instructing the rotorcraft to pitch nose up. In some embodiments, the FCC is further operable to generate the attitude command as part of an automated flight control process. In some embodiments, the FCC is operable to generate the adjusted attitude command by limiting a magnitude of the pitch command to avoid a tail strike. In some embodiments, the FCC is operable to generate the adjusted attitude command in response to the AGL altitude being less than an altitude threshold. In some embodiments, the FCC is operable to generate the adjusted attitude command by limiting the magnitude of the pitch command according to an attitude limit. In some embodiments, the FCC is operable to generate the adjusted attitude command by limiting the magnitude of the pitch command to the attitude limit.

An embodiment flight control computer (FCC) includes a processor, and a non-transitory computer-readable storage medium storing a program to be executed by the processor. The program includes instructions for determining an attitude command, determining an above ground level (AGL) altitude, generating, in response to the AGL altitude being below an altitude threshold, an adjusted attitude command by limiting a magnitude of the attitude command, and controlling a flight characteristic of a rotorcraft by sending the adjusted attitude command to one or more flight controls.

In some embodiments, the instructions for determining the AGL altitude include instructions for receiving a radar altitude sensor data indicating the AGL altitude. In some embodiments, the attitude command is a pitch command instructing the rotorcraft to pitch nose up. In some embodiments, the program further includes instructions for executing an automated flight control process, and the instructions for determining the attitude command include instructions for generating the attitude command through the automated flight control process. In some embodiments, the instructions for generating the adjusted attitude command include instructions for generating, in response to the AGL altitude being below an altitude threshold and further in response to the magnitude of the attitude command being above an attitude threshold, the adjusted attitude command by limiting the magnitude of the attitude command. In some embodiments, the instructions for generating the adjusted attitude command include instructions for generating, in response to the AGL altitude being below an altitude threshold and further in response to the magnitude of the attitude command being above the attitude threshold, the adjusted attitude command by limiting the magnitude of the attitude command to the attitude threshold.

An embodiment method includes determining an attitude command by a flight control computer (FCC), determining an above ground level (AGL) altitude, generating, by the FCC and in response to the AGL altitude being below an altitude threshold, an adjusted attitude command by limiting a magnitude of the attitude command, and controlling, by the FCC, a flight characteristic of a rotorcraft by sending the adjusted attitude command to one or more flight controls.

In some embodiments, wherein the determining the AGL altitude comprises receiving, by the FCC, a radar altitude sensor data indicating the AGL altitude. In some embodiments, wherein the attitude command is a pitch command instructing the rotorcraft to pitch nose up. In some embodiments, the method further includes executing, by the FCC, an automated flight control process, and the determining the attitude command includes generating the attitude command through the automated flight control process. In some embodiments, the generating the adjusted attitude command includes generating, in response to the AGL altitude being below an altitude threshold and further in response to the magnitude of the attitude command being above an attitude threshold, the adjusted attitude command by limiting the magnitude of the attitude command. In some embodiments, the generating the adjusted attitude command includes generating, in response to the AGL altitude being below an altitude threshold and further in response to the magnitude of the attitude command being above the attitude threshold, the adjusted attitude command by limiting the magnitude of the attitude command to the attitude threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
a main rotor;
one or more flight controls connected to the main rotor and operational to control flight characteristics of the main rotor by pitching a nose of the rotorcraft upward; and
a flight control computer (FCC) operable to:
execute an automated flight control process;
determine an attitude command and generate, through the automated flight control process, the attitude command;
generate, in response to a source of the attitude command being the automated flight control process, an adjusted attitude command by adjusting a magnitude of the attitude command according to an above ground level (AGL) altitude of the rotorcraft, and control a flight characteristic of the rotorcraft in response to the source of the attitude command being the automated flight control process by sending the adjusted attitude command to one or more flight controls; and
control the flight characteristic of the rotorcraft, in response to the source of the attitude command being a pilot, by sending the attitude command to one or more flight controls.

2. The rotorcraft of claim 1, further comprising a radar altitude sensor operable to detect the AGL altitude of the rotorcraft during flight.

3. The rotorcraft of claim 1, wherein the attitude command is a pitch command instructing the rotorcraft to pitch nose up.

4. The rotorcraft of claim 3, wherein the FCC is operable to generate the adjusted attitude command by limiting a magnitude of the pitch command to avoid a tail strike.

5. The rotorcraft of claim 4, wherein the FCC is operable to generate the adjusted attitude command in response to the AGL altitude being less than an altitude threshold.

6. The rotorcraft of claim 4, wherein the FCC is operable to generate the adjusted attitude command by limiting the magnitude of the pitch command according to an attitude limit.

7. The rotorcraft of claim 6, wherein the FCC is operable to generate the adjusted attitude command by limiting the magnitude of the pitch command to the attitude limit.

8. A flight control computer (FCC), comprising:
a processor; and
a non-transitory computer-readable storage medium storing a program to be executed by the processor, the program including instructions for:
executing an automated flight control process;
determining an attitude command and generating, through the automated flight control process, the attitude command;
determining an above ground level (AGL) altitude;
generating, in response to the AGL altitude being below an altitude threshold, and in response to a source of the attitude command being the automated flight control process, an adjusted attitude command by limiting a magnitude of the attitude command; and
controlling a flight characteristic of a rotorcraft in response to the source of the attitude command being the automated flight control process by sending the adjusted attitude command to one or more flight controls; and
controlling the flight characteristic of the rotorcraft, in response to the source of the attitude command being a pilot, by sending the attitude command to one or more flight controls.

9. The FCC of claim 8, wherein the instructions for determining the AGL altitude include instructions for receiving a radar altitude sensor data indicating the AGL altitude.

10. The FCC of claim 8, wherein the attitude command is a pitch command instructing the rotorcraft to pitch nose up.

11. The FCC of claim 8, wherein the instructions for generating the adjusted attitude command include instructions for generating, in response to the AGL altitude being below an altitude threshold and further in response to the magnitude of the attitude command being above an attitude threshold, the adjusted attitude command by limiting the magnitude of the attitude command.

12. The FCC of claim 11, wherein the instructions for generating the adjusted attitude command include instructions for generating, in response to the AGL altitude being below an altitude threshold and further in response to the magnitude of the attitude command being above the attitude threshold, the adjusted attitude command by limiting the magnitude of the attitude command to the attitude threshold.

13. A method, comprising:
executing, by a flight control computer (FCC), an automated flight control process;
determining an attitude command by the FCC and generating, through the automated flight control process, the attitude command;
determining an above ground level (AGL) altitude;
generating, by the FCC, in response to the AGL altitude being below an altitude threshold, and in response to a source of the attitude command being the automated flight control process, an adjusted attitude command by limiting a magnitude of the attitude command, and controlling, by the FCC, a flight characteristic of a rotorcraft in response to the source of the attitude command being the automated flight control process by sending the adjusted attitude command to one or more flight controls; and
controlling the flight characteristic of the rotorcraft, in response to the source of the attitude command being a pilot, by sending the attitude command to one or more flight controls.

14. The method of claim 13, wherein the determining the AGL altitude comprises receiving, by the FCC, a radar altitude sensor data indicating the AGL altitude.

15. The method of claim 13, wherein the attitude command is a pitch command instructing the rotorcraft to pitch nose up.

16. The method of claim 13, wherein the generating the adjusted attitude command comprises generating, in response to the AGL altitude being below an altitude threshold and further in response to the magnitude of the attitude command being above an attitude threshold, the adjusted attitude command by limiting the magnitude of the attitude command.

17. The method of claim 16, wherein the generating the adjusted attitude command comprises generating, in response to the AGL altitude being below an altitude threshold and further in response to the magnitude of the attitude command being above the attitude threshold, the adjusted attitude command by limiting the magnitude of the attitude command to the attitude threshold.

* * * * *